(12) United States Patent
Yang et al.

(10) Patent No.: US 6,949,297 B2
(45) Date of Patent: Sep. 27, 2005

(54) HYBRID ADHESIVES, ARTICLES, AND METHODS

(75) Inventors: Jie Yang, Woodbury, MN (US); Dmitriy Salnikov, Woodbury, MN (US); Jason W. Balich, Beverly, MA (US)

(73) Assignee: 3M Innovative Properties Company, St. Paul, MN (US)

( * ) Notice: Subject to any disclaimer, the term of this patent is extended or adjusted under 35 U.S.C. 154(b) by 186 days.

(21) Appl. No.: 10/005,669

(22) Filed: Nov. 2, 2001

(65) Prior Publication Data

US 2003/0192638 A1 Oct. 16, 2003

(51) Int. Cl.[7] .................... B32B 27/08; C08F 2/46; C09J 9/00; C09J 133/04; C09J 163/00
(52) U.S. Cl. .................. 428/520; 428/522; 522/15; 522/31; 522/121; 522/129
(58) Field of Search .................. 522/15, 31, 32, 522/121, 129; 428/520, 522

(56) References Cited

U.S. PATENT DOCUMENTS

| | | | |
|---|---|---|---|
| 3,914,017 A | | 10/1975 | Bedell et al. |
| 4,156,035 A | * | 5/1979 | Tsao et al. |
| 4,488,919 A | | 12/1984 | Butler |
| 5,011,560 A | | 4/1991 | Nakai et al. |
| 5,086,086 A | | 2/1992 | Brown-Wensley et al. |
| 5,086,088 A | * | 2/1992 | Kitano et al. |
| 5,137,055 A | | 8/1992 | Matsushima et al. |
| 5,151,454 A | | 9/1992 | Goto et al. |
| 5,252,694 A | | 10/1993 | Willett et al. |
| 5,360,659 A | | 11/1994 | Arends et al. |
| 5,369,141 A | | 11/1994 | Coleman et al. |
| 5,432,797 A | | 7/1995 | Takano |
| 5,475,038 A | | 12/1995 | Skoultchi |
| 5,593,759 A | | 1/1997 | Vargas et al. |
| 5,612,136 A | | 3/1997 | Everaerts et al. |
| 5,666,223 A | | 9/1997 | Bennett et al. |
| 5,721,289 A | | 2/1998 | Karim et al. |
| 5,773,485 A | * | 6/1998 | Bennett et al. |
| 5,858,624 A | | 1/1999 | Chou et al. |
| 5,895,801 A | | 4/1999 | Lee |
| 5,897,727 A | | 4/1999 | Staral et al. |
| 5,905,099 A | * | 5/1999 | Everaerts et al. ........... 522/126 |
| 6,013,722 A | | 1/2000 | Yang et al. |
| 6,042,943 A | | 3/2000 | Levy |

(Continued)

FOREIGN PATENT DOCUMENTS

| | | | |
|---|---|---|---|
| DE | 44 29 791 A1 | | 2/1996 |
| EP | 729494 | * | 8/1998 |
| EP | 1 375 617 A1 | | 1/2004 |
| EP | 1 375 618 A1 | | 1/2004 |
| GB | 1 550 382 | | 8/1979 |
| JP | 2-178380 | * | 7/1990 |
| JP | 10-120994 | * | 5/1998 |
| WO | WO 84/03837 | | 10/1984 |
| WO | WO 94/13749 | | 6/1994 |
| WO | WO 99/42536 | | 8/1999 |
| WO | WO 02/06413 A1 | | 1/2002 |
| WO | WO 02/086623 A1 | | 10/2002 |

OTHER PUBLICATIONS

ASTM–D 1003–95, "Standard Test Methods for Haze and Luminous Transmittance of Transparent Plastics".
ASTM–E 96–80, "Standard Test Methods for Water Vapor Transmission of Materials".

*Primary Examiner*—Steven D. Maki
(74) *Attorney, Agent, or Firm*—Lisa P. Fulton (57) ABSTRACT

Described are curable adhesives containing a polyacrylate component and an epoxy component, and that are preferably optically clear, as well as methods of using such adhesives and optical components and optical elements prepared from the adhesives.

19 Claims, 2 Drawing Sheets

U.S. PATENT DOCUMENTS

| | | |
|---|---|---|
| 6,049,419 A | 4/2000 | Wheatley et al. |
| 6,088,079 A * | 7/2000 | Kameyama et al. ........ 349/185 |
| 6,180,200 B1 | 1/2001 | Ha et al. |
| 6,194,317 B1 | 2/2001 | Kaisaki et al. |
| 6,277,485 B1 | 8/2001 | Invie et al. |
| 6,319,603 B1 * | 11/2001 | Komiya et al. |
| 6,423,392 B1 | 7/2002 | Koch et al. |
| 6,589,623 B2 | 7/2003 | Roth |
| 6,645,617 B1 | 11/2003 | Okazaki et al. |
| 6,764,804 B2 | 7/2004 | Bourdelais et al. |
| 2001/0025083 A1 | 9/2001 | Stark et al. |
| 2003/0192638 A1 | 10/2003 | Yang et al. |

* cited by examiner

HYBRID ADHESIVES, ARTICLES, AND METHODS

FIELD OF THE INVENTION

The invention relates to curable adhesives, particularly including a polyacrylate and any epoxy component. The invention further relates to methods of using such adhesives and to articles prepared using the adhesives, such as optical products.

BACKGROUND

Curable adhesives are useful in industry. An example of curable adhesives is the type described in U.S. Pat. No. 5,252,694. Specific applications for pressure sensitive adhesives, having sufficient clarity, involve the preparation of optical elements. See, for example, U.S. Pat. Nos. 6,180,200 and 5,897,727. Curable pressure sensitive adhesives can be useful and preferred due to their ability to be applied to substrates while the adhesive is tacky like a pressure sensitive adhesive, and to subsequently cure the adhesive to form a secure structural adhesive bond.

While a variety of curable adhesives have been prepared from countless combinations and mixtures of ingredients including various polymers, e.g., acrylates, (meth)acrylates; epoxies; crosslinkers; other heat and cationically curable polymers; and heat or radiation sensitive initiators; not all such compositions are suitable for use, especially in optical applications where clarity and stability are required. A useful adhesive for optical applications should be optically clear, and should also maintain that clarity over the life of the product in which it is used. The adhesive should withstand conditions present during manufacturing of optical elements and during use of such elements without losing a substantial amount of clarity. This property involves the adhesive being stable on its own, and also being stable and compatible when used with other elements in an optical element or optical product.

Optical elements include not only adhesives but other components bonded together by the adhesive. The adhesives are used, for example, to bond materials to polymeric materials such as polyesters; to bond materials to rigid materials such as rigid polycarbonate, polymethyl methacrylate, or glass; to bond materials to polarizer layers; etc.

Often, any of these components of an optical element, or other adjacent components, can adversely affect the stability, clarity, bond strength, or other performance property of an adhesive in the same optical element. Polycarbonates, for example, are known to outgas, producing bubbles or partial or full delamination at the adhesive bond between the polycarbonate and another layer of an optical element. Bubbling and delamination can be particularly common when the outgassing layer is bonded to another layer or laminate that exhibits low vapor transmissivity. Bubbles and delamination can affect clarity and integrity of the optical element, and must be avoided. It can be preferred, therefore, in these and other settings, that an adhesive be stable and not delaminate, bubble, or lose its clarity or integrity during use.

As another matter, other optical materials can be particularly fragile, and may, for example, exist in the form of a fragile film. The fragile film can be a material that is not thermally stable, is not dimensionally stable, is water or humidity sensitive, etc. Such a material may shrink or otherwise degrade when exposed to a high temperature or high humidity condition. It can be difficult to include these fragile materials in optical elements, due to such instability. An example of a type of fragile material is polarizer of the type known as a "KE polarizer," which, due to their thinness, may shrink when exposed to a certain minimum temperature and humidity. It can often be useful and even advantageous for a variety of reasons such as cost or performance, to use such fragile materials in a larger optical element. Thus, it would be useful to find a way to maintain the stability of fragile materials so they can be used in useful products, including optical elements.

SUMMARY OF THE INVENTION

The invention relates to adhesive compositions that include a polyacrylate and an epoxy component. Preferred adhesives can be considered as "hybrid" adhesives, which can exhibit properties of a pressure sensitive adhesive in combination with a curable structural adhesive. The pressure sensitive adhesive properties can be due to a polyacrylate component, and the structural adhesive properties can be due to an epoxy component. Preferred embodiments of the compositions can have useful optical transmissivity, e.g., be optically clear, and can remain substantially optically clear for a period of a useful product lifetime. The polyacrylate component and epoxy component can optionally and preferably be formed into an interpenetrating polymer network, more preferably an inter-reacted interpenetrating polymer network, to provide additional stability and clarity. This can be done using a crosslinker or by direct reaction between functional groups of the epoxy component and the polyacrylate.

The relative amounts and chemical compositions of materials in the curable adhesive, including polyacrylate, epoxy component (sometimes referred to as "epoxy resin,"), and cationic photoinitiator, and also including optional components such as other photoinitiators, crosslinkers, grafting agents, photosensitizers, etc., can be selected to provide a curable adhesive and a cured adhesive that exhibit desired combinations of properties including tackiness, bond strength, stability, and, in particular for use with optical products, clarity and stability of clarity. A preferred cured adhesive can be a single phase, which enhances optical clarity, bond strength, and stability. A single phase can be provided by selecting a proper amount of epoxy component versus polyacrylate, for example less than sixty parts by weight epoxy component (e.g., "epoxy resin") based on one hundred parts total epoxy component and polyacrylate. A minimum amount of epoxy component will provide structural integrity in the cured adhesive. The minimum amount can vary, but an exemplary lower limit may be in the range from about 1 to about 5 parts by weight epoxy component based on one hundred parts total epoxy component and polyacrylate.

The invention further relates to methods of using the curable adhesives, for example by applying the curable adhesive to a substrate and later curing the adhesive. Additional steps of inventive methods may include placement of the adhesive onto a release liner; optional drying of an optional solvent in the adhesive or polymerization or curing of (meth)acrylate monomers or polyacrylate components; or other steps, techniques, or methods known to be used in the preparation of optical elements using a curable adhesive.

The adhesive, being optically clear, can be useful to make a variety of useful products, especially products that benefit from an optically transmissive adhesive such as optical elements and optical products. Optical elements typically include a number of different layers of different materials, which can be any one or more of polymeric, glass, metal or metallized polymer, or of the present adhesive or another adhesive, e.g., another pressure sensitive or structural adhesive. Any one or more of these materials may be flexible, rigid, reflective, antireflective, polarizing, and is typically sufficiently optically transmissive to function as a component of the optical element.

Some materials used in optical products may have particular physical or chemical properties that can create adverse effects within the optical product. As an example, some materials may outgas, compromising an adhesive bond if the outgassing affects the adhesive and adhesion. Some materials may be low in their ability to transmit moisture vapor, possibly exacerbating the effects of the outgassing layer on an intervening adhesive. The adhesives described herein can be useful and preferred, because the adhesives can be optically transmissive and can maintain a structural integrity to resist combined effects such as outgassing and low moisture vapor transmission.

Other optical material layers may be fragile, for example heat sensitive, humidity sensitive, water sensitive, or otherwise sensitive to mechanical stresses or to conditions to which an optical material may be exposed during preparation or use. The fragile layer may upon exposure to such condition degrade, shrink, rip, tear, or stretch, or otherwise lose its structural integrity. The adhesive described herein can be useful, and preferred, when used adjacent to such a fragile material, because the adhesive in such a position can provide structural support for a fragile layer. With the adhesive supporting the fragile layer, the fragile layer, if exposed to conditions such as heat, moisture, or water, or mechanical stress, etc., will be structurally supported by the adhesive and will not degrade or lose its structural integrity.

Thus, the invention contemplates the use of the described adhesive for any application, especially applications within optical products or optical elements, and especially to bond materials where an optically transmissive or clear adhesive is useful, required, or desired. The invention specifically contemplates bonding materials that tend to outgas, and where such outgassing tends to compromise integrity of an adhesive bond between the outgassing material and another material. Even more specifically, the invention contemplates bonding an outgassing material to a material that has a low moisture vapor transmission rate.

In addition, the invention contemplates the use of the described adhesive to provide structural support for fragile layers such as heat or humidity sensitive polarizing polymeric films. This includes providing the cured adhesive onto at least one, optionally two surfaces of a fragile material so that the material can be used in conditions which would otherwise cause the material to degrade, shrink, wrinkle, rip, tear, stretch, or otherwise lose shape or integrity. When exposed to such conditions, the cured adhesive adjacent to the fragile layer provides structural support and integrity to the fragile layer and prevents such degradation. In this context, the adhesive may be used as merely a protective layer on one or both sides of a fragile layer, or the adhesive may be used to bond the fragile layer to yet another material as part of a larger product, e.g., an optical element.

An aspect of the invention relates to a curable adhesive composition. The adhesive includes: polyacrylate component, epoxy component, and cationic initiator. The uncured adhesive is optically clear such that the luminous transmission of the composition is greater than 90%, the haze of the composition is less than 2%, and the opacity of the composition is less than 1%. The uncured, curable adhesive can preferably be cured to form an adhesive comprising an interpenetrating polymer network. After aging the cured adhesive at 90° C. for 500 hours the luminous transmission of the cured and aged adhesive is greater than 90%, the haze of the cured and aged adhesive is less than 2%, and the opacity of the cured and aged adhesive is less than 1%.

Another aspect of the invention relates to a multi-layer assembly that includes a cured adhesive containing an interpenetrating polymer network. The interpenetrating polymer network includes a polyacrylate component and epoxy component, the adhesive composition is optically clear, and the assembly includes a low moisture vapor transfer layer adhered to the adhesive composition.

Another aspect of the invention relates to a method of preparing a multi-layer article. The method includes coating onto a release liner a curable adhesive composition comprising polyacrylate component, epoxy component, and cationic initiator; drying the curable adhesive composition to remove solvent; laminating the curable adhesive composition onto a substrate; and activating the initiator to cure the adhesive.

Yet another aspect of the invention relates to a method of providing structural support to a fragile material. The method includes applying the curable adhesive to a surface of the fragile material and curing the adhesive.

BRIEF DESCRIPTION OF THE DRAWINGS

All figures are not drawn to scale.

DETAILED DESCRIPTION

The invention contemplates specific adhesive compositions prepared to include a polyacrylate and an epoxy component, with cationic initiator for curing the epoxy component. The uncured adhesive includes properties of a pressure sensitive adhesive. This allows the uncured adhesive to conveniently and accurately be applied and positioned, e.g., between a substrate and a material to be bonded to the substrate. Subsequently, the curable adhesive can be cured to create a structural bond between materials.

The adhesive can preferably be optically transmissive, e.g., optically clear, in one or both of its uncured and cured state. Optical clarity allows the adhesive to be used in preparing optical elements. The adhesive can also maintain optical clarity, e.g., transmissivity, for a useful period of time under normal use conditions and as shown by accelerated aging tests. A balance of desired clarity, stability, bond strength, integrity, etc., can be achieved in an adhesive by selection of the combination of ingredients of the adhesive, including specifically the polyacrylate (and its constituent monomers), the epoxy component, and the cationic initiator. Additional ingredients can be selected to balance properties of clarity, bond strength, integrity, stability, etc., as will be appreciated, including crosslinkers, grafting agents, sensitizers, etc., all in amounts that will also balance and improve properties of the adhesive.

The polyacrylate component is a polymeric component generally prepared by polymerizing (meth)acrylate monomers. Acrylate and methacrylate monomers are referred to collectively herein as "(meth)acrylate" monomers. Polymers prepared from one or more of such (meth)acrylate monomers, optionally with any one or more of a variety of other useful monomers, will be referred to collectively as "polyacrylates." The polymers can be homopolymers or copolymers, optionally in combination with other, non-(meth)acrylate, e.g., vinyl-unsaturated, monomers. Such polyacrylate polymers and their monomers are well-known in the polymer and adhesive arts, as are methods of preparing the monomers and polymers. One of skill will understand and recognize that such polymers can be useful as pressure sensitive adhesives, and will understand their use in providing an adhesive as described herein, in combination with an epoxy component, to provide properties of a pressure sensitive adhesive. Pressure sensitive adhesive (PSA) compositions are well known to those of ordinary skill in the art to possess properties including (1) aggressive and permanent tack, (2) adherence with no more than finger pressure, (3) sufficient ability to hold onto an adherend, and (4) sufficient cohesive strength. Materials that have been found to function well as PSAs include polymers designed and formulated to exhibit the requisite viscoelastic properties resulting in a desired balance of tack, peel adhesion, and shear holding power.

Specific examples of polyacrylate polymers useful according to the invention include those prepared from free-radically polymerizable acrylate monomers or oligomers such as described in U.S. Pat. No. 5,252,694 at col. 5, lines 35–68. While the invention can be accomplished with any variety of different (meth)acrylate monomers and polyacrylates, it can be preferable, to provide stability, clarity, and an inter-reacted IPN, for the polyacrylate to include one or more reactive functional groups that can be reacted to connect the polyacrylate directly or indirectly to the epoxy component, i.e. for connecting the polyacrylate to the epoxy component to produce an inter-reacted interpolymer network. These reactive functional groups can be any known reactive groups, such as hydroxy (—OH) or acidic (e.g., carboxylic, —COOH) reactive groups. Such groups can be included in a polyacrylate, for example, by including an appropriate monomer in preparing the polyacrylate, such as an acrylic acid monomer. Alternatively, this inter-reaction between polyacrylate and epoxy can be achieved through the use of bi- or multi-functional monomers such as epoxy acrylates in conjunction with grafting groups that can react with the polyacrylate. Still another example of producing an inter-reacted IPN is by including an epoxy-functional group on the polyacrylate backbone. An all-epoxy-functional system could be cured with cationic initiator without need for other initiators such as free-radical initiators.

Examples of useful monomers include specifically, but not exclusively, the following classes:

Class A—acrylic acid esters of an alkyl alcohol (preferably a non-tertiary alcohol), the alcohol containing from 1 to 14 (preferably from 4 to 14) carbon atoms and include, for example, methyl acrylate, ethyl acrylate, n-butyl acrylate, t-butyl acrylate, hexyl acrylate, isooctyl acrylate, 2-ethylhexyl acrylate, isononyl acrylate, isobornyl acrylate, phenoxyethyl acrylate, decyl acrylate, and dodecyl acrylate;

Class B—methacrylic acid esters of an alkyl alcohol (preferably a non-tertiary alcohol), the alcohol containing from 1 to 14 (preferably from 4 to 14) carbon atoms and include, for example, methyl methacrylate, ethyl methacrylate, n-propyl methacrylate, n-butyl methacrylate, isobutyl methacrylate and t-butyl methacrylate;

Class C—(meth)acrylic acid monoesters of polyhydroxy alkyl alcohols such as 1,2-ethanediol, 1,2-propanediol, 1,3-propane diol, the various butyl diols, the various hexanediols, glycerol, such that the resulting esters are referred to as hydroxyalkyl (meth)acrylates;

Class D—multifunctional (meth)acrylate esters such as 1,4-butanediol diacrylate, 1,6-hexanediol diacrylate, glycerol diacrylate, glycerol triacrylate, and neopentyl glycol diacrylate although these monomers are generally not preferred for reactive extrusion or melt blending;

Class E—macromeric (meth)acrylates such as (meth)acrylate-terminated styrene oligomers and (meth)acrylate-terminated polyethers, such as are described in PCT Patent Application WO 84/03837 and European Patent Application EP 140941;

Class F—(meth)acrylic acids and their salts with alkali metals, including, for example, lithium, sodium, and potassium, and their salts with alkaline earth metals, including, for example, magnesium, calcium, strontium, and barium.

Suitable epoxy materials for use according to the invention will also be recognized by those of skill in the chemical and adhesive and structural adhesive arts. Such epoxy materials include cationically-polymerizable monomers, a large variety of which are well known in the chemical and adhesive arts. See, for example, U.S. Pat. No. 5,897,727, the entire description of which is incorporated herein by reference. General examples of useful epoxy component include epoxy monomers and macromers, multi-functional epoxy crosslinkers, and aliphatic and cyclic epoxy monomers and macromers. Optionally and preferably, the epoxy component can include a functionality that can be reacted directly or through a crosslinker or other linking chemical material to the acrylate component, to form an inter-reacted inter-penetrating polymer network. Preferred epoxies can be selected, in combination with other ingredients of the adhesive, to provide a desired balance of properties including clarity, bond strength, integrity, and stability.

Exemplary epoxy component materials are described in U.S. Pat. No. 5,252,694 at col. 4, line 30 thru col. 5, line 34, the entire description of which is incorporated herein by reference.

Preferred epoxy monomers can include cycloaliphatic, aliphatic, cyclic, and aromatic epoxy monomers. Important examples include bisphenol A and bisphenol F epoxies such as those commercially available under the trade names EPON 828, EPON 1001F, and EPONEX Resin 1510 commercially available from Shell Chemicals, Houston, Tex. Important examples of cycloaliphatic epoxy monomers include the ERL series of cycloaliphatic epoxy monomers such as ERL-4221 or ERL-4206, commercially available from Union Carbide, Danbury, Conn.

Optionally and preferably, the polyacrylate and epoxy components, upon cure, can form an interpenetrating polymer network (IPN). There are at least two types of interpenetrating polymer networks, those that do not react between components, and those that do react to form a chemical bond between different components (inter-reacted IPNs). Specifically, one form of IPN according to the invention includes polymers of polyacrylate and epoxies entangled between themselves into a network that mechanically connects the intertwined and entangled chains of polymers. The mechanically entangled nature of the IPN adds strength and integrity to the adhesive and can prevent phase separation and loss of clarity. A second form of IPN according to the invention includes an inter-reacted interpenetrating polymer network, wherein the epoxy component is directly or indirectly chemically bonded to the polyacrylate component. Here, the epoxy component and the polyacrylate component contain reactive functional groups that can react directly or indirectly to each other. As an example, an epoxy group is directly reactive with a hydroxy or acidic functionality of the polyacrylate component. Alternatively, the polyacrylate and epoxy components can be chemically bonded to an intermediate chemical component such as a di- or multi-functional polymer, crosslinker, macromer, or oligomer. The intermediate chemical component chemically connects the epoxy component to the polyacrylate, producing an inter-reacted IPN which has even further increased integrity and optical clarity.

The epoxy and polyacrylate can be included in an adhesive composition in any relative amounts that, in combination with photoinitiator and any other optional components, will result in a useful balance of properties of the cured and uncured adhesive, preferably meaning at least an optically clear, stable adhesive.

For the polyacrylate, an amount can be included to provide the adhesive with functional properties of a pressure sensitive adhesive, including a useful amount of tack or tackiness and other PSA properties. These and other properties of pressure sensitive adhesives are well understood. Therefore, useful amount of polyacrylate will also be understood.

For the epoxy component, any amount can be included to provide sufficient structural strength, and preferred stability and clarity, in a given application. Preferably, an amount of epoxy component can be included to provide a sufficient bond strength to maintain optical clarity of the adhesive during use and over time, under conditions that would be experienced by the adhesive or a product that incorporates the adhesive. In particular, the amount of epoxy component can provide a bond that does not delaminate or bubble over time, under a variety of environmental conditions. The required bond strength will depend on the materials being bonded, but preferred amounts of epoxy component can provide adhesives according to the invention that will not bubble or delaminate over time when used to bond an outgassing material to a low moisture vapor transmission material. Preferably, the amount of epoxy component will be sufficiently high to provide such structural bond strength, but will also be sufficiently low so that the adhesive will maintain a single phase and not separate into epoxy component and polyacrylate phases. A single phase will improve optical clarity.

Overall, epoxy component and polyacrylate can be included in the adhesive in relative amounts that will provide a desired combination of pressure sensitive adhesive properties, structural bond properties, and optical clarity, with stability of these properties and clarity over time during use. In general, depending on factors such as the chemical identities and molecular weights, amount of cross-linking, etc., of the epoxy component and polyacrylate, among other variables, less than about 60 parts by weight epoxy component based on 100 parts by weight total epoxy component and polyacrylate can provide a single phase cured adhesive composition that will have acceptable optical clarity. Preferred amounts can be less than about 55 or 50 parts by the weight total epoxy component based on one hundred parts by weight epoxy component and polyacrylate. At the low end, an amount of epoxy component useful to provide sufficient bond strength can depend on factors such as the type of epoxy component and polyacrylate, but in general, useful amounts can be from at least about 1 or about 5 parts by weight epoxy component based on 100 parts by weight epoxy component and polyacrylate. A preferred range of the two components can be from about 20 to about 40 parts by weight epoxy component based on a total of one hundred parts by weight epoxy component and polyacrylate.

At least one initiator is included in the adhesive to cure the adhesive, in particular by initiating cure of the epoxy component to form a structural bond. Initiators useful to cure epoxies include cationic photoinitiators, which are well known in the adhesive arts. It can be preferred to use a photoactivated initiator rather than a heat activated initiator in applications of the adhesive that would avoid exposure to temperatures used to activate heat activated initiator. One of skill will recognize useful amounts and useful chemistries of such photoinitiators for inclusion in adhesives described herein.

Useful cationic photoinitiators include any of a variety of known useful materials for curing epoxies, including examples such as onium salts and certain organometallic complexes. The description of exemplary organometallic complexes as well as their use with a number of epoxies and acrylates, can be found, for example, in U.S. Pat. Nos. 5,252,694, 5,897,727, and 6,180,200, the entire disclosures of which are incorporated herein by reference.

Exemplary onium salts have been described as having the structure AX wherein: A can be an organic cation, e.g., selected from diazonium, iodonium, and sulfonium cations, preferably selected from diphenyliodonium, triphenylsulfonium and phenylthiophenyl diphenylsulfonium; and X is an anion, the counterion of the onium salts including those in which X is organic sulfonate, or halogenated metal or metalloid.

Particularly useful onium salts include, but are not limited to, aryl diazonium salts, diaryl iodonium salts, and triaryl sulfonium salts. Additional examples of the onium salts are described in U.S. Pat. No. 5,086,086, col. 4, lines 29–61, the entire disclosure of which is incorporated herein by reference.

Useful amounts of cationic photoinitiator will be well understood, with the amount functionally being sufficient to cause curing of the adhesive, in particular, an amount of cationic photoinitiator suitable for the selected amount and chemistry of epoxy component, to provide a useful structural adhesive bond. Preferred or typical amounts of cationic photoinitiator can be in the range from about 0.1 to about 5 parts by weight cationic initiator per one hundred parts by weight epoxy component, with the range from about 0.5 to about 3 parts by weight being preferred.

Optionally it is contemplated by this invention to include photosensitizers in the curable adhesive composition. Photosensitizers can be used to alter the wavelength sensitivity of a photoinitiator. Representative examples of photosensitizers include anthracene, benzophenone, perylene, phenothiazine, xanthone, thioxanthone, acetophenone, fluorenone, anthraquinone, 9-methylanthracene, 2-ethyl-9,10-dimethoxyanthracene, 9,10-diethoxy anthracene, camphorquinone, and 1,3-diphenylisobenzofuran.

Additionally, a grafting agent can be used to cause inter-reaction of the polyacrylate and the epoxy component or to crosslink the polyacrylate. An example of a grafting agent is 4-Acryloxy Benzophenone (ABP). The grafting agent generates free radicals on the polyacrylate. These free radicals can react with (meth)acrylate groups such as in an epoxy-acrylate or (meth)acrylate crosslinkers or with other grafting agent-generated free radicals in the polyacrylate.

As an example of one embodiment to form inter-reacted IPNs, epoxy-acrylates such as EBYCRYL 1561 can be used in conjunction with a grafting agent. The grafting agent-generated free radical sites react with the acrylate of the epoxy-acrylate and the epoxy component reacts with the epoxy of the epoxy-acrylate. The addition of a free radical photoinitiator may improve reaction efficiency.

Grafting agents can also be used with multifunctional (meth)acrylate crosslinkers to crosslink the polyacrylate. Addition of a free-radical photoinitiator may improve the reaction efficiency.

An exemplary class of useful crosslinkers is the class of poly-functional acrylates, including di-, tri-, etc., functional acrylate compounds. Examples of preferred crosslinkers include hexanediol diacrylate (HDDA) and trimethylolpropane triacrylate (TMPTA), commercially available from Aldrich Chemical, Milwaukee, Wis., and mixtures thereof.

A crosslinker can be included in the adhesive in a useful amount, preferably an amount that can improve properties of the adhesive. Such amounts will be well understood by the skilled artisans. Exemplary amounts of multi-functional (meth)acrylate compounds (again, referring to both acrylates and (meth)acrylates) can be in the range from about 0 to about 30 parts by weight multifunctional (meth)acrylate based on one hundred parts by weight polyacrylate and epoxy component, with preferred amounts being in the range from about 0.1 to about 10 parts by weight multifunctional (meth)acrylate based on one hundred parts by weight polyacrylate and epoxy component. Amounts outside of this range can also be useful, with a particular amount of crosslinker for any adhesive composition depending on a number of various factors including the chemistry of the crosslinker, the chemistry of the polyacrylate and epoxy component, and the desired properties of the cured and uncured adhesive.

Free-radical photoinitiators that are useful for reacting or polymerizing polyacrylate materials are well understood, as are their use and the amounts to be included in an adhesive as described herein. Exemplary free-radical photoinitiators useful for polymerizing a polyacrylate in combination with grafting agents and/or epoxy-acrylates, or multifunctional acrylate crosslinkers include the benzoin ethers, such as benzoin methyl ether or benzoin isopropyl ether, substituted benzoin ethers, such as anisoin methyl ether, substituted acetophenones, such as 2,2-diethoxyacetophenone and 2,2-dimethoxy-2-phenylacetophenone, substituted alpha-ketols, such as 2-methyl-2-hydroxypropiophenone, aromatic sulfonyl chlorides, such as 2-naphthalene-sulfonyl chloride, and photoactive oximes, such as 1-phenyl-1,2-propanedione-2 (O-ethoxycarbonyl)oxime.

Useful amounts of free-radical photoinitiator will be understood, with the amount being sufficient to cause reaction, polymerization, or cross-linking of the adhesive composition. Preferred or typical amounts can be in the range from a number about 0.01 to about 5 parts by weight free-radical initiator for one hundred parts by weight total (meth)acrylate and polyacrylate content of the adhesive composition, with the range from about 0.1 to about 1 parts by weight being preferred.

Other materials that can be included in the curable adhesive include mono- and polyols, tackifiers, reinforcing agents, and other modifiers, some of which may copolymerize with the free-radically or cationically polymerizable monomers, oligomers, or polymers, or polymerize independently.

While solventless embodiments are visualized within the scope of this invention it is preferred that solvents are used in preparing the adhesive compositions of the invention. Representative solvents preferably organic, include acetone, methyl-ethyl-ketone, ethyl acetate, heptane, toluene, cyclopentanone, methyl cellosolve acetate, methylene chloride, nitromethane, methyl formate, gamma-butyrolactone, propylene carbonate, and 1,2-dimethoxyethane (glyme).

Irradiation sources that provide light in the region from 200 to 800 nm are effective for curing the adhesive according to the invention. A preferred region is between 250 to 700 nm. Suitable sources of radiation include mercury vapor discharge lamps, carbon arcs, quartz halogen lamps, tungsten lamps, xenon lamps, fluorescent lamps, lasers, sunlight, etc. The required amount of exposure to effect polymerization can depend on factors such as the identity and concentrations of particular free radically and cationically polymerizable monomers, the thickness of the exposed material, type of substrate, intensity of the radiation source and amount of heat associated with the radiation.

The curable adhesive compositions can be prepared by conventional methods of combining and optionally reacting (meth)acrylate materials, polyacrylate materials, epoxies, photoinitiators, and any adjuvants. See, for example, U.S. Pat. Nos. 5,252,694, 5,897,727, and 6,180,200. Generally, polyacrylate materials such as those described above can be directly combined with the described epoxy materials and other components of a curable adhesive composition, including crosslinkers, initiators, etc., in amounts as useful and as described herein.

The curable adhesive compositions may be applied by any conventional application method, including but not limited to gravure coating, curtain coating, slot coating, spin coating, screen coating, transfer coating, brush or roller coating, and the like. The thickness of a coated adhesive layer, typically in the form of a liquid, prior to curing, is in part dependent on the nature of the materials used and the specific properties desired, but those properties and the relationship of thickness to the properties is well understood in the art. Exemplary thicknesses of an uncured, curable adhesive layer may be in the range from about 0.05 to about 100 micrometers.

The adhesive composition is preferably optically clear. Optical clarity can be measured in the number of different ways, as will be appreciated by the skilled artisan, but for the purposes of this disclosure optical clarity can be measured according to ASTM-D 1003-95. When so measured, preferred uncured adhesives according to the invention can exhibit a luminous transmission of at least about 90%, haze of less than about 2%, and opacity of less than about 1%. Upon curing, optical clarity of the cured adhesive, as measured according to ASTM-D 1003-95, can be in the same ranges.

Because a preferred property of the curable adhesive composition is to not contribute to the loss of luminous transmission of a multi-layer article, e.g., a laminate, compared to the elements without the adhesive present, when the luminous transmission is measured for a laminate, the transmission can be recorded using the most transmissive substrate as a reference. For example for a glass/adhesive/film laminate, glass can be used as the reference (i.e., the transmission through the glass can be set as 100% transmission) and the percent transmission of the laminate can be relative to that of glass alone.

Preferred adhesives can maintain useful optical transmissivity over a useful life of the adhesive, and can also maintain a secure bond strength and resist or avoid delamination or bubbling to maintain optical clarity between elements of a multilayer product, over a useful life. Such stability and retention of optical transmissivity can be measured by accelerated aging tests, whereby samples of adhesive optionally bonded to one or two other materials are exposed to elevated temperature, optionally with elevated humidity conditions, for a period of time. Preferred adhesives of the invention can retain their optical clarity after such accelerated aging tests as follows: after aging a cured adhesive at 90° C. for 500 hours in an oven for accelerated aging, the luminous transmission of the cured and aged adhesive can be greater than 90%, the haze of the cured and aged adhesive can be less than 2%, and the opacity of the cured and aged adhesive can be less than 1%. The humidity of the 90° C. oven is not controlled, and is ambient for an oven in an inside space; at 90° C. the relative humidity can generally be below 10 or 20 percent.

Alternatively, using a different accelerated aging test, after accelerated aging of a cured adhesive at 80° C. and 90% relative humidity in an oven with temperature and humidity control for 500 hours, the luminous transmission of the cured and aged adhesive can be greater than 90%, the haze of the cured and aged adhesive can be less than 2%, and the opacity of the cured and aged adhesive can be less than 1%, as measured according to ASTM D 1003-95 (for T% and haze).

The adhesive, being optically clear, can be useful in bonding together components of a variety of optical components, optical elements, and optical products. More generally, the adhesive can be useful in bonding together any type of product, and is particularly useful if the product requires or benefits from an optically transmissive, preferably optically clear, adhesive.

Optical elements include articles and products that have an optical effect or optical application, such as screens for computers or other displays; components of such screens such as polarizing layers, reflective layers, and that reflective layers, selectively reflective layers such as infrared reflecting optically clear layers; coatings for windows which may polarize or reflect; other partially or fully reflective optically transmissive products, etc.

Examples of optical elements include optical elements wherein an adhesive is used to bond together one or more different layers of optical materials, typically layers or films that are at least partially optically transmissive, reflective, polarizing, or optically clear. Optical elements typically include a number of different layers of different materials, which can be any one or more of polymeric, glass, metal or metallized polymer, or of the present adhesive or another adhesive, e.g., another pressure sensitive or structural adhesive. Any one or more of these materials may also provide a desired physical property including flexibility, rigidity, strength, or support, or can be one or more of reflective, partially-reflective, antireflective, polarizing, selectively transmissive or reflective with respect to different wavelengths, and is typically sufficiently optically transmissive to function within an optical element. Such layers can be prepared from well known optical materials including materials that are polymeric, glass, or metallic, and also from layers of adhesives. Any one or more of these materials or layers may be a fragile layer, an outgassing layer, or a low moisture vapor transmissive layer (see below).

Examples of rigid layers that can be included to provide support for an optical element include glass or rigid polymeric materials such as polycarbonates, polyacrylates, polyesters, etc. Often, such rigid polymeric materials, especially when relatively thick (for example in the range of millimeters or centimeters, as opposed to smaller dimensions), can exhibit a property of outgassing. This is a well-known and frustrating problem in optical products and optical elements. This outgassing problem can be exacerbated if the outgassing layer is bonded to a layer that does not allow the gas to pass through, but acts as a barrier to the gas, resulting in the gas collecting at the adhesive interface and causing bubbling or delamination, reduced bond strength, or loss of clarity. Adhesives of the invention offer improved bond strength and stability and can therefore reduce or eliminate such bubbling or delamination even where the adhesive is used to bond an outgassing layer to a low moisture vapor transmissive layer.

Specific examples of outgassing layers include polycarbonates, such as polycarbonates having a thickness in the range from about one or three millimeters up to any larger thickness; and polyacrylates such as polymethyl methacrylate, for example having a thickness of at least amount one to three millimeters up to any larger thickness.

Materials considered to have low moisture vapor transmission rates are also known and understood and include certain chemistries and constructions of films, including polymeric films that may or may not include certain coatings that can effectively act as barriers to moisture vapor. The threshold level of moisture vapor transmissivity that can cause delamination, bubbling, loss of bond strength, or loss of clarity in a specific optical product construction can depend on various factors such as the composition of an outgassing layer and the amount of gas it produces, conditions of use, and the composition and overall strength, integrity, and stability of an adhesive. As an example, film materials that have a moisture vapor transmission rate of 30 grams per (meter squared×24 hours) or less can be considered a low moisture vapor transmissive material (as measured by ASTM E96-80). Whether or not such a material will cause an unstable adhesive bond, bubbling, delamination, or loss of clarity during use, will depend on factors such as the identity of the adhesive and the identity of the materials that the adhesive is bonded to. Other examples of materials that might be considered to exhibit a low moisture vapor transmission rates may have a transmission rate that is below about 20 grams per (meter squared×24 hours), especially a transmission rate below about 10 or even 5 grams per (meter squared×24 hours) (as measured by ASTM E96-80).

Examples of low moisture vapor transmission rate films include metallized films used for their antireflective or conductive properties (for example for EMI shielding) in optical elements. Metallized films include films such as polyethylene terephthalate (PET) or other polymeric materials that include a surface that is partially or fully coated with a metal or metallic material. More specific examples include multilayer AR (antireflective) film such as described in U.S. Pat. No. 6,277,485 columns 13 and 14, the entire disclosure of the patent being incorporated herein by reference. Another low moisture vapor transmission material includes the class of microlayer films such as those described in U.S. Pat. No. 6,049,419 (the entire disclosure of which is incorporated herein by reference), any of which can be reflective, partially reflective, or otherwise optically useful. Even certain uncoated polymeric films can exhibit low moisture vapor transmission, depending on their thickness and construction. Such polymeric materials of sufficient thickness can substantially reduce or prevent the flow of moisture vapor, acting as a polymeric moisture vapor barrier. One example is a polyethylene terephthalate film of a thickness of about 127 μm such as ICI 617 from Imperial Chemical Industries Films, Hopewell, Va.

Other materials useful in an optical element can include films or layers of material that are fragile or susceptible to damage. The fragile film can be a material that is not stable, for example is not thermally stable, is water or humidity sensitive, etc., or has such poor integrity or structural strength that it is easily ripped, torn, or stretched out of shape. A material that is not stable may, for example, shrink or otherwise degrade when exposed to a high temperature or high humidity condition, or easily tear or stretch. An example of a type of fragile material is a heat sensitive or moisture sensitive material, such as a KE polarizer, which may shrink when exposed to a certain minimum temperature or humidity condition. KE polarizers, generally, are polarizing materials well-known in the optical materials arts, and described, for example, among numerous others, in U.S. Pat. Nos. 3,914,017, and 5,666,223, the entire disclosures of which are incorporated herein by reference. These polarizing materials typically are thin (e.g., about 15 µm to about 35 µm films prepared from polyvinyl alcohol components, stretched to orient the molecules into a polarizing film. The materials and processes are well understood to a skilled artisans in the optical products parts. The epoxy component and polyacrylate adhesive described herein may be bonded to a surface of a KE polarizer and cured, so that the cured adhesive supports or maintains the structural stability of the polarizer, at or above such a temperature or humidity, for example, preventing the KE polarizer from shrinking. The adhesive may also be applied to any other fragile material to provide structural integrity to prevent or reduce the possibility of ripping, tearing, or stretching, etc. Similarly, the adhesive may be used to bond fragile material to another material, for example to another component of an optical element.

The invention contemplates the use of the described polyacrylate and epoxy component adhesive to bond any of the above-described or other outgassing materials to any of the above-described or other low moisture vapor transmissive materials, preferably to create an optically clear and environmentally stable bond within an optically transmissive multilayer article. The invention also contemplates bonding the described adhesive to any fragile material, such as the exemplified KE polarizer. The purpose of the adhesive on such a fragile material can be simply to provide support and integrity for using a fragile material, in any context. The polyacrylate and epoxy component adhesive can be adhered to one side of the fragile material or to two sides of the fragile material. Other materials useful with the polarizer layer, including but not limited to any of the materials described herein for constructing optical elements, can also be bonded to the fragile material with the described adhesive.

Below are described, as illustrated and FIGS. 1–4, certain exemplary embodiments of multi-layer, optical products prepared according to the present invention. These embodiments are illustrative of the larger invention described herein of using the described curable adhesive for any application, but especially where optical clarity is desired.

Figure 1:
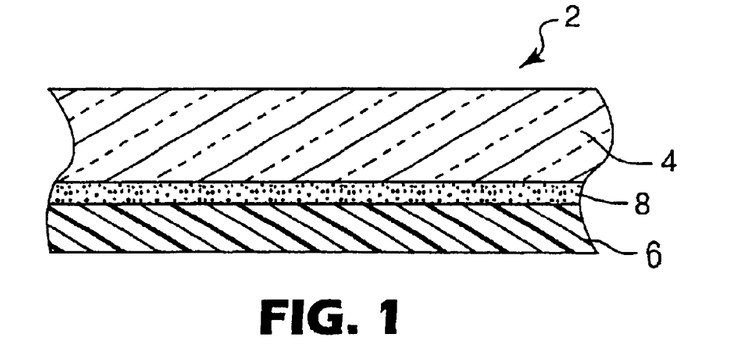
FIG. 1 illustrates an embodiment of an optical element according to the invention, comprising an outgassing layer and a low moisture vapor transmissive layer.

FIG. 1 illustrates an embodiment of an optical element according to the invention, comprising a low moisture vapor transmissive film bonded using the curable adhesive to an outgassing layer. Referring to the figure, optical element 2 includes outgassing layer 4 bonded to low moisture vapor transmissive film 6 using optically transmissive adhesive 8 comprising a polyacrylate component and an epoxy component, as described herein. The outgassing layer 4 can be any outgassing material, as described above or otherwise, such as a rigid polycarbonate or polyacrylate, and the low moisture vapor transmissive film can be any such film as described above or otherwise. Outgassing layer 4 may be 4.4 millimeter thick polycarbonate or 3.0 mm thick acrylic, and low moisture vapor transmissive film 6 can be an AR Film. Alternatively, low moisture vapor transmissive film 6 may be an IR film (i.e., an infrared reflecting film), such as a microlayer film having selective transmissivity such as an optically clear but infrared reflecting film as described in U.S. Pat. No. 5,360,659, the entire disclosure of which is incorporated herein by reference.

Figure 2:
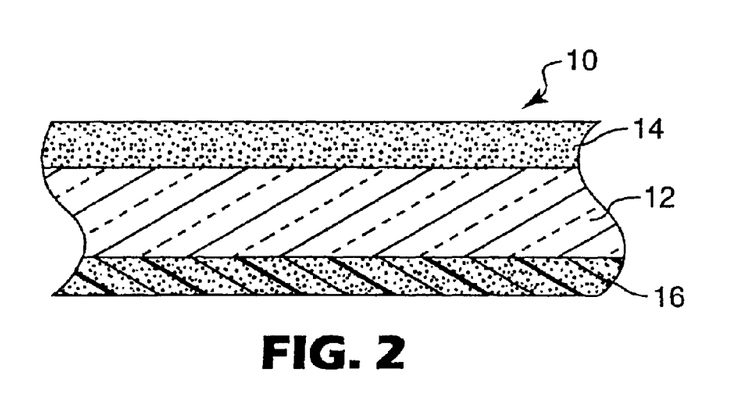
FIG. 2 illustrates an embodiment of an optical element according to the invention, consisting of a fragile film supported by a cured adhesive.

FIG. 2 illustrates an embodiment of an optical element according to the invention, consisting of a fragile film supported by a cured adhesive. Referring to FIG. 2, multi-layer article 10 includes fragile layer 12 and at least one cured adhesive layer 14 on a surface of the fragile layer 12. The adhesive layer is a polyacrylate and epoxy component layer as described in the present description. Optional adhesive layer 16 can be provided on the opposite surface of fragile layer 12, which adhesive layer may be an epoxy component and polyacrylate adhesive as described herein, or any other type of structural or pressure sensitive adhesive. The fragile layer can be a polarizer such as a KE polarizer described above, or any other type of fragile film or material. The thickness of the adhesive layer can be sufficient to provide structural strength or to provide bonding to another material. Optionally, but not shown in the figure, either of the adhesive layers may bond the fragile material to another substrate, such as another material of and optical element. (See, e.g., FIGS. 3 and 4.)

Figure 3:
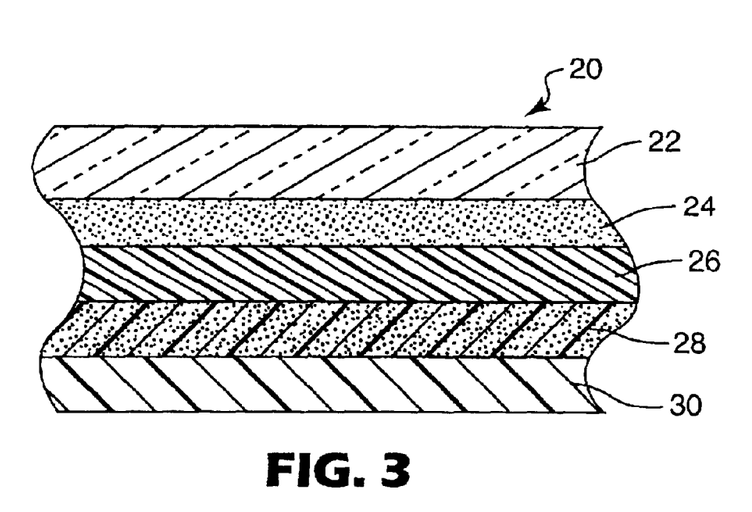
FIG. 3 illustrates an embodiment of a polarizing optical element according to the invention.

FIG. 3 illustrates an embodiment of a polarizing optical element according to the invention. FIG. 3 shows polarizing optical element 20 that includes LCD glass layer 22, pressure sensitive adhesive layer 24, KE polarizing layer 26, polyacrylates and epoxy component adhesive layer 28 (as described herein), and layer 30 is a transflective film.

Figure 4:
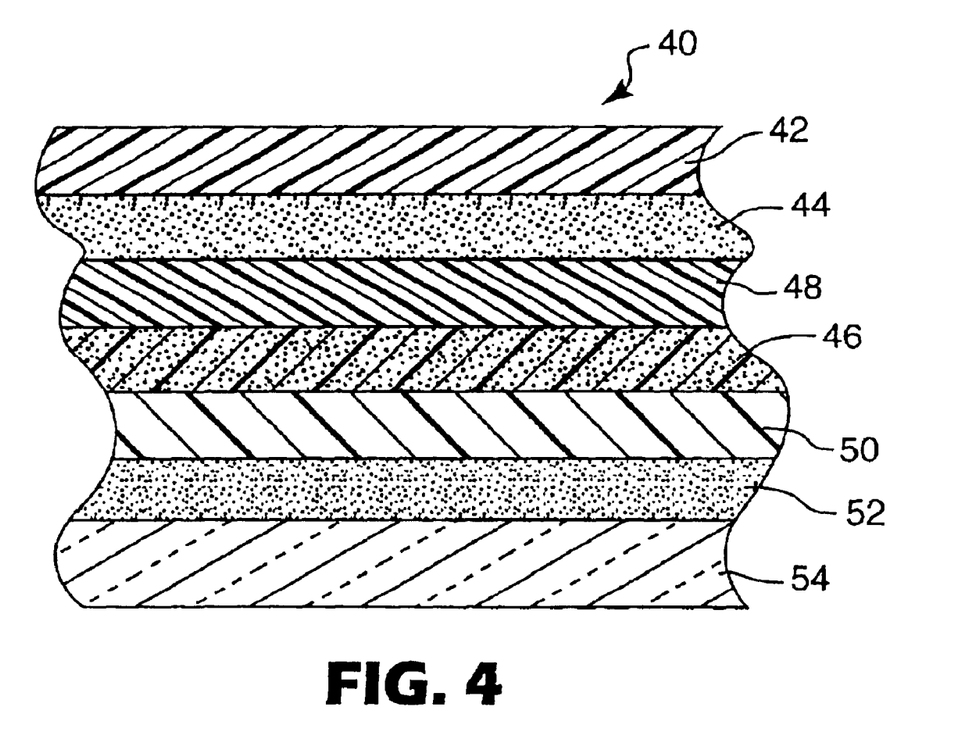
FIG. 4 illustrates an embodiment of a polarizing optical element according to the invention.

FIG. 4 illustrates another embodiment of a polarizing optical element according to the invention. FIG. 4 shows polarizing optical element 40 that includes PET layer 42, adhesive layers 44 and 46, KE polarizing layer 48, PC retarder layer 50, pressure sensitive adhesive layer 52, and LCD glass layer 54. At least one of, and optionally both of adhesive layers 44 and 46 is a polyacrylate and epoxy component adhesive layer as described herein. The second layer may also be such a polyacrylate and epoxy component adhesive, or may be a different pressure sensitive or structural adhesive.

The invention further relates to methods of using the curable adhesives, for example by dispensing the curable adhesive onto a substrate, optionally contacting the curable adhesive with another material, such as a different layer of a multi-layer article, and later curing the adhesive. Exemplary steps of inventive methods may include placement of the adhesive onto a release liner; optional drying of an optional solvent in the adhesive or polymerization or curing reaction of acrylate monomers or polyacrylate components; and curing of the epoxy component; or other steps, techniques, or methods known to be used in the preparation of multi-layer articles a hybrid adhesive.

The invention further relates to methods of forming a protective coating on a film or other material, especially a fragile material, by dispensing the adhesive onto one or both sides of the film or alternatively dispensing the adhesive onto a release liner and laminating to one or both sides of the film, and then curing the adhesive to form a non-tacky protective coating on one or both sides. This is particularly useful with fragile films such as certain heat sensitive polarizing materials.

Adhesives as described herein can, in an important embodiment of the invention, be used in methods typically understood to be useful for preparing optically clear components and optical elements. Exemplary methods of preparing optical elements include, among others, those identified in U.S. Pat. Nos. 5,897,727, 5,858,624, and 6,180,200, each of which is incorporated herein by reference. The uncured adhesive composition is typically in the form of a liquid that can be coated or applied by methods generally useful with liquid pressure sensitive adhesives, e.g., coated onto a release liner. If solvent is used, solvent can later be removed from the coated adhesive. An example of a useful next step would be to transfer the coated by the uninsured adhesive onto a substrate, typically with lamination.

Exemplary release liners are well known and commercially available, and include paper and film liners coated with release agents such as silicones, fluorocarbons, etc such as the T-30 liner available from CP Film, Martinsville, Va.

In certain embodiments of the invention, the adhesive can then be cured in a next step, for example if the adhesive is intended to support another material such as a fragile material.

In other embodiments of the invention, the adhesive-bearing substrate can then be contacted with another material for bonding. This step can be accomplished by lamination or otherwise. After contacting to another material, the adhesive can be cured.

EXAMPLES

These examples are merely for illustrative purposes only and are not meant to be limiting on the scope of the appended claims. All parts, percentages, ratios, etc. in the examples and the rest of the specification are by weight unless indicated otherwise.

| Table of Abbreviations | |
|---|---|
| AA | Acrylic acid |
| MA | Methyl Acrylate |
| BA | n-Butyl Acrylate |
| AR Film | Antireflective film as described in US patent number 6,277,485 column 13 line 60-column 14 line 39, with a sheet resistance of 65 ohm/square. |
| Polycarbonate Retardation Film | Polycarbonate film of 70 µm thickness from Teijin Industries |
| Glass Microscope Slide | 75 millimeter × 50 millimeter × 1 millimeter Corning No. 2947 MicroSlides commercially available from Corning Glass Works; Corning, NY |
| IOA | Isooctyl acrylate |
| IRGACURE 651 | Photoinitiator 2,2 dimethoxy-2-phenylacetophenone, available from Ciba; Hawthorne, NJ |
| PET | polyester film of polyethylene terephthalate |
| MVTR | Moisture Vapor Transmission Rate |
| Bostik Adhesive | A polyester based adhesive coated out of methyl ethyl ketone solvent and crosslinked with an isocyanate based material at a dry thickness of 5–15 µm. |
| Soken 1885 PSA | Acrylic based PSA coated out of ethyl acetate to a dry thickness of 15–40 µm. |
| KE Polarizer Film | 20–30 µm thick polyvinyl alcohol based film as described in U.S. Pat. No. 3,914,017 and U.S. Pat. No. 5,666,223 |
| PTC 21 Conductive Film | Metallized polymeric film of indium-tin-oxide (36 nm)/gold (1 nm)/silver (8 nm)/gold (1 nm)/indium-tin-oxide (36 nm)/silicon oxide (30 nm)/transphan with a sheet resistance of 13 ohms/square |

-continued

| Table of Abbreviations | |
|---|---|
| Transphan | 100 µm thick poly(biscyclopentadiene) condensate film |
| IR Film | Multilayer IR reflecting film comprises alternating layers of PET (A-layer) and co-PMMA (B-layer). These layers are arranged in 6 layer optical repeat units with respective optical thickness of about 7A, 1B, 1A, 7B, 1A, 1B, with 96 such optical repeat units for a total of 576 layers. This film reflects light in the infrared wavelength region between about 900–1300 nm while allowing light transmission in the visible between 380–770 nm. |
| T-30 Release Liner | Silicone release material coated on 50.8 µm thick PET film commercially available from CP Film, Martinsville, VA |
| TTE | Trimethylolpropane triglycidyl ether, commercially available from Aldrich Chemicals, Milwaukee, WI |
| ABP | 4-Acryloxy Benzophenone (25% solids in ethyl acetate) |
| TMPTA | Trimethylolpropane triacrylate, commercially available from Aldrich Chemicals, Milwaukee, WI |
| EPON 828 | Aromatic epoxy component commercially available from Shell Chemicals, Houston, TX |
| ERL 4221 | Aliphatic epoxy component commercially available from Union Carbide, Danbury, CT |
| EBECRYL 1561 | Acrylated epoxy component commercially available from UCB Chemicals Corp., Smyrna, GA |
| CD1012 | Photoinitiator commercially available from Sartomer Company, Exton, PA |
| RHODORSIL 2074 | Photoinitiator commercially available from Rhodia Inc., Cranbury, NJ |
| PMMA Plate | Optix acrylic Plate, 3.0 millimeter thick polymethyl methacrylate commercially available from Plaskolite, Inc., Columbus, OH |
| Polycarbonate Plate | 4.4 millimeter thick LEXAN commercially available from General Electric, Schenectady, NY |
| Anthracene | Commercially available from Aldrich Chemical, Milwaukee, WI |
| Benzophenone (BZP) | Commercially available from Aldrich Chemical, Milwaukee, WI |
| ICI 617 PET | Polyester film used as base film for AR film from Imperial Chemical Industries Films, Hopewell, VA. |
| HB3 | PET film from Teijin Industries |

Test Methods

Luminous Transmittance and Haze

The luminous transmittance and haze of all samples were measured according to American Society for Testing and Measurement (ASTM) Test Method D 1003-95 ("Standard Test for Haze and Luminous Transmittance of Transparent Plastic") using a TCS Plus Spectrophotometer from BYK-Gardner Inc.; Silver Springs, Md. Sample preparation details are described in the text.

Opacity Measurement

The same samples used for haze and luminous transmittance measurements were used for opacity measurement. The BYK Gardner TCS Plus Spectrophotometer was used for opacity measurement, with the standard size reflectance port (25 mm) installed, and diffuse reflectance (specular excluded) was measured. Desired optical property value is opacity <1%.

Accelerated Aging Tests

Several different aging protocols have been used for testing the aging properties of coated and cured laminate structures. One protocol is carried out by placing the laminate in a 90° C. oven for 500 hours and is called the "90° C./500 hour test". Another is carried out by placing the laminate in an oven with controlled humidity at 80° C., 90% relative humidity for 500 hours and is called the "80° C./90% RH/500 hour test". Closely related testing protocols are at 85° C. for 7 days (the "85° C./7 day test") and 80° C., 90% relative humidity for 7 days (the "80° C./90% RH/7 day test"). The results of all testing protocols is determined by visual observation or the use of the optical test methods described above to determine whether the optical properties of the sample are maintained. The data are reported as either "Pass" if the sample retains its optical clarity or "Bubble(s)" if bubble(s) are present in the adhesive bond line when visual observation was used, otherwise the optical data obtained using the test methods described above are presented.

Reference Optical Properties

The optical properties of the substrates AR Film, PET, Glass Microscope Slide, PMMA Plate, IR Film and Polycarbonate Plate were tested for luminous transmittance, haze and opacity as a reference point for when these substrates are used in laminates. These values are shown in Table A.

TABLE A

| Substrate | Luminous Transmittance (%) Averaged 380–720 nm | Haze (%) C2° | Haze (%) A2° | Opacity (%) C2° | Opacity (%) A2° |
|---|---|---|---|---|---|
| AR Film | 89.2 | 0.8 | 0.8 | 0.4 | 0.4 |
| PET | 88.8 | 0.8 | 0.8 | 0.5 | 0.5 |
| Glass Microscope Slide | 92.4 | 0.1 | 0.1 | 0.2 | 0.2 |
| PMMA Plate | 91.6 | 1.3 | 1.2 | 0.3 | 0.3 |
| IR Film | 88.0 | 0.9 | 0.9 | 0.7 | 0.7 |
| Polycarbonate Plate | 86.8 | 0.2 | 0.2 | 0.5 | 0.5 |

MVTR Test

The moisture vapor transmission rate test was conducted by following ASTM E96-80 "Standard Test methods for Water Vapor Transmission of Materials," the water method. The test temperature was 40° C., and the relative humidity in the test chamber was 20%. The results are shown in Table B.

TABLE B

| Film Sample | MVTR (gram/m$^2$ × 24 hr.) |
|---|---|
| AR Film* | 1.4 |
| ICI 617 PET | 22 |
| IR Film | 22 |
| Polycarbonate Retardation Film | 72 |

*Non-metallized side of the film was facing the water.

Polyacrylate Synthesis Samples

Polyacrylate A

A solvent based pressure sensitive adhesive prepared according to conventional radical thermal polymerization procedure using 57.5 parts IOA, 35 parts MA and 7.5 parts AA. The PSA was about 26% solids in ethyl acetate/toluene.

Polyacrylate B

A solvent based pressure sensitive adhesive prepared according to conventional radical thermal polymerization procedure using 81 parts MA and 19 parts BA. The PSA was about 25% solids in ethyl acetate, and had an intrinsic viscosity of 0.71.

EXAMPLES 1–7

COMPARATIVE EXAMPLES C1–C2

Adhesive Preparation

In a brown glass reaction vessel was placed Anthracene, RHODORSIL 2074 and Ethyl Acetate in the amounts shown in Table 1. Once all of the solids were dissolved, Polyacrylate A was added and the resulting mixture was mixed well. To this mixture was added either EPON 828 or ERL 4221 and TTE in the amounts shown in Table 1.

TABLE 1

| Ex. | Polyacrylate A (grams) | Ethyl Acetate (grams) | EPON 828 (grams) | ERL 4221 (grams) | TTE (grams) | Rhodorsil 2074 (grams) | Anthracene (grams) |
|---|---|---|---|---|---|---|---|
| 1 | 96.0 | 50.0 | 2.34 | 0 | 0.25 | 0.38 | 0.10 |
| 2 | 96.0 | 50.0 | 4.69 | 0 | 0.25 | 0.38 | 0.10 |
| 3 | 96.0 | 50.0 | 9.38 | 0 | 0.25 | 0.38 | 0.10 |
| 4 | 96.0 | 50.0 | 12.50 | 0 | 0.25 | 0.38 | 0.10 |
| 5 | 96.0 | 50.0 | 17.50 | 0 | 0.25 | 0.38 | 0.10 |
| 6 | 96.0 | 50.0 | 21.00 | 0 | 0.25 | 0.38 | 0.10 |
| 7 | 96.0 | 50.0 | 0 | 17.5 | 0.25 | 0.38 | 0.10 |
| C1 | 96.0 | 50.0 | 25.00 | 0 | 0.25 | 0.38 | 0.10 |
| C2 | 96.0 | 50.0 | 31.00 | 0 | 0.25 | 0.38 | 0.10 |

Laminate Preparation

After mixing, this solution was coated onto the non-metallized side of an AR Film, dried at 70° C. for 10 minutes to yield a 37.5 μm thick dry PSA tape. Samples of this PSA tape were laminated onto a Polycarbonate Plate, PMMA Plate or Glass Microscope Slide. After 24 hour dwell, these laminates were irradiated (through the AR Film) with a Fusion UV Curing System at the following conditions for a total UVA (320–390 nm) dose of about 1 J/cm$^2$: Fusion "D" bulb, 300 Watts/Inch, 50 feet/minute, 2 passes. After irradiation, these samples were stored at ambient temperature for at least 24 hours before any aging test was carried out.

Optical Properties Testing

The AR Film/adhesive/Glass Microscope Slide laminates were tested for Luminous Transmittance, Haze and Opacity according to the test methods described above. The optical data are presented in Table 2.

TABLE 2

| Example | Epoxy component (% by weight) | Luminous Transmittance (%)* Averaged 380–720 nm | Haze (%) C2° | Haze (%) A2° | Opacity (%) C2° | Opacity (%) A2° |
|---|---|---|---|---|---|---|
| 1 | 7% | 95.2 | 0.8 | 0.8 | 0.4 | 0.3 |
| 2 | 13% | 95.0 | 0.8 | 0.8 | 0.4 | 0.3 |
| 3 | 26% | 95.5 | 0.8 | 0.8 | 0.4 | 0.3 |
| 4 | 33% | 95.0 | 0.9 | 0.9 | 0.4 | 0.3 |
| 5 | 40% | 95.2 | 0.9 | 0.9 | 0.4 | 0.4 |
| 6 | 45% | 95.3 | 0.8 | 0.8 | 0.4 | 0.4 |
| C1 | 50% | 92.4 | 1.3 | 1.3 | 1.2 | 1.1 |
| C2 | 55% | 71.7 | 76.9 | 72.6 | 9.2 | 8.8 |

*Glass used as reference, T % = 100% through glass slide

Aging Tests

Laminates of AR Film/adhesive/Polycarbonate Plate, AR Film/adhesive/Glass Microscope Slide and AR Film/adhesive/PMMA Plate were aged using the test protocols described above. These results and details of the test conditions are presented in Tables 3–6.

TABLE 3

| Example AR Film/adhesive/ Polycarbonate Laminates | Aging Test Conditions (90° C. for 500 hours) | Aging Test Conditions (80° C./90% RH for 500 hours) |
|---|---|---|
| 1 | Bubbles | Bubbles |
| 2 | Bubbles | Bubbles |
| 3 | Pass | Pass |
| 4 | Pass | Pass |
| 5 | Pass | Pass |
| 6 | Pass | Pass |

TABLE 4

| Example AR Film/adhesive/Glass Laminates (After Aging Test Conditions of 90° C. for 500 hours) | Luminous Transmittance (%)* Averaged 380–720 nm | Haze (%) C2° | Haze (%) A2° | Opacity (%) C2° | Opacity (%) A2° |
|---|---|---|---|---|---|
| 1 | 95.1 | 1.1 | 1.0 | 0.7 | 0.7 |
| 2 | 94.7 | 1.4 | 1.3 | 0.6 | 0.6 |
| 3 | 96.0 | 1.2 | 1.2 | 0.5 | 0.5 |
| 4 | 95.5 | 0.9 | 0.9 | 0.4 | 0.4 |
| 5 | 95.5 | 1.0 | 1.0 | 0.6 | 0.6 |
| 6 | 95.1 | 1.1 | 1.1 | 0.6 | 0.6 |
| C1 | 93.5 | 1.4 | 1.4 | 1.2 | 1.1 |
| C2 | 72.4 | 74.5 | 72.9 | 9.2 | 8.7 |

*Glass used as reference, T % = 100% through glass slide

TABLE 5

| Example AR Film/adhesive/PMMA Laminates | Aging Test Conditions (90° C. for 500 hours) | Aging Test Conditions (80° C./90% RH for 500 hours) |
|---|---|---|
| 1 | Bubbles | Bubbles |
| 2 | Bubbles | Bubbles |
| 3 | Pass | Pass |
| 4 | Pass | Pass |
| 5 | Pass | Pass |
| 6 | Pass | Pass |

TABLE 6

| Example AR Film/adhesive/ PMMA Laminates (After Aging Test Conditions of 90° C. for 500 hours) | Luminous Transmittance (%)* Averaged 380–720 nm | Haze (%) C2° | Haze (%) A2° | Opacity (%) C2° | Opacity (%) A2° |
|---|---|---|---|---|---|
| 3 | 93.8 | 1.5 | 1.5 | 0.6 | 0.6 |
| 4 | 93.6 | 1.4 | 1.4 | 0.6 | 0.6 |
| 5 | 93.7 | 1.5 | 1.5 | 0.6 | 0.6 |
| 6 | 93.6 | 1.4 | 1.3 | 0.6 | 0.6 |
| C1 | 88.5 | 1.9 | 1.8 | 1.9 | 1.7 |
| C2 | 71.0 | 96.1 | 90.1 | 8.0 | 7.4 |

*PMMA used as reference, T % = 100% through PMMA plate

EXAMPLES 8–11

COMPARATIVE EXAMPLE C3

Adhesive Preparation

In a brown glass reaction vessel was placed Anthracene, RHODORSIL 2074, Irgacure 651, and Ethyl Acetate in the amounts shown in Table 7. Once all of the solids were dissolved, Polyacrylate A was added and the resulting mixture was mixed well. To this mixture was added ABP, TMPTA, EPON 828 and TTE in the amounts shown in Table 7.

TABLE 7

| Ex. | Polyacrylate A (grams) | Ethyl Acetate (grams) | Irgacure 651 (grams) | ABP (grams) | TMPTA (grams) | Epon 828 (grams) | TTE (grams) | Rhodorsil 2074 (grams) | Anthracene (grams) |
|---|---|---|---|---|---|---|---|---|---|
| 8 | 96.0 | 50.0 | 0.25 | 1.0 | 0.50 | 9.38 | 0.25 | 0.38 | 0.10 |
| 9 | 96.0 | 50.0 | 0.50 | 2.0 | 4.60 | 21.00 | 0.25 | 0.38 | 0.10 |
| 10 | 96.0 | 50.0 | 0.50 | 2.0 | 9.20 | 21.00 | 0.25 | 0.38 | 0.10 |
| 11 | 96.0 | 50.0 | 0.50 | 2.0 | 13.80 | 21.00 | 0.25 | 0.38 | 0.10 |
| C3 | 96.0 | 0 | 0 | 0 | 0 | 0 | 0 | 0 | 0 |

Laminate Preparation

After mixing, this solution was coated onto the non-metallized side of an AR Film, dried at 70° C. for 10 minutes to yield a 37.5 μm thick dry PSA tape. Samples of this PSA tape were laminated onto a Polycarbonate Plate, PMMA Plate or Glass Microscope Slide. After 24 hour dwell, these laminates were irradiated (through the AR Film) with a Fusion UV Curing System at the following conditions for a total UVA (320–390 nm) dose of about 1 J/cm$^2$: Fusion "D" bulb, 300 Watts/Inch, 50 feet/minute, 2 passes. After irradiation, these samples were stored at ambient temperature for at least 24 hours before any aging test was carried out.

Optical Properties Testing

The AR Film/adhesive/Glass Microscope Slide laminates were tested for Luminous Transmittance, Haze and Opacity according to the test methods described above. The optical data are presented in Table 8.

TABLE 8

| Example | Epoxy component (% by weight) | TMPTA (% by weight) | Luminous Transmittance (%)* Averaged 380–720 nm | Haze (%) C2° | Haze (%) A2° | Opacity (%) C2° | Opacity (%) A2° |
|---|---|---|---|---|---|---|---|
| 8 | 26% | 0.7% | 95.8 | 0.9 | 0.9 | 0.4 | 0.4 |
| 9 | 40% | 8.8% | 95.8 | 0.9 | 0.9 | 0.4 | 0.4 |
| 10 | 37% | 16% | 96.0 | 1.0 | 1.0 | 0.4 | 0.3 |
| 11 | 35% | 22% | 95.8 | 0.7 | 0.7 | 0.4 | 0.4 |
| C3 | 0% | 0% | 96.7 | 0.8 | 0.8 | 0.4 | 0.4 |

*Glass used as reference, T % = 100% through glass slide

Aging Tests

Laminates of AR Film/adhesive/Polycarbonate Plate, AR Film/adhesive/Glass Microscope Slide and AR Film/adhesive/PMMA Plate were aged using the test protocols described above. These results and details of the test conditions are presented in Tables 9–12.

TABLE 9

| Example AR Film/adhesive/Polycarbonate Laminates | Aging Test Conditions (90° C. for 500 hours) | Aging Test Conditions (80° C./90% RH for 500 hours) |
|---|---|---|
| 8 | Pass | Pass |
| 9 | Pass | Pass |
| 10 | Pass | Pass |
| 11 | Pass | Pass |
| C3 | Bubbles | Bubbles |

TABLE 10

| Example AR Film/adhesive/Glass Laminates (After Aging Test Conditions of 90° C. for 500 hours) | Luminous Transmittance (%)* Averaged 380–720 nm | Haze (%) C2° | Haze (%) A2° | Opacity (%) C2° | Opacity (%) A2° |
|---|---|---|---|---|---|
| 8 | 96.0 | 1.0 | 1.0 | 0.4 | 0.4 |
| 9 | 95.8 | 1.2 | 1.2 | 0.5 | 0.5 |
| 10 | 96.2 | 1.0 | 1.0 | 0.5 | 0.4 |
| 11 | 95.7 | 1.0 | 1.0 | 0.5 | 0.5 |

*Glass used as reference, T % = 100% through glass slide

TABLE 11

| Example AR Film/adhesive/PMMA Laminates | Aging Test Conditions (90° C. for 500 hours) | Aging Test Conditions (80° C./90% RH for 500 hours) |
|---|---|---|
| 8 | Pass | Pass |
| 9 | Pass | Pass |
| 10 | Pass | Pass |
| 11 | Pass | Pass |
| C3 | Bubbles | Bubbles |

TABLE 12

| Example AR Film/adhesive/PMMA Laminates (After Aging Test Conditions of 90° C. for 500 hours) | Luminous Transmittance (%)* Averaged 380–720 nm | Haze (%) C2° | Haze (%) A2° | Opacity (%) C2° | Opacity (%) A2° |
|---|---|---|---|---|---|
| 8 | 93.3 | 1.4 | 1.4 | 0.6 | 0.6 |
| 9 | 94.1 | 1.4 | 1.4 | 0.5 | 0.5 |
| 10 | 94.3 | 1.5 | 1.5 | 0.5 | 0.5 |
| 11 | 94.1 | 1.4 | 1.4 | 0.5 | 0.5 |

*PMMA used as reference, T % = 100% through PMMA plate

EXAMPLES 12–14

Adhesive Preparation

In a brown glass reaction vessel was placed Irgacure 651 and Ethyl Acetate in the amounts shown in Table 13. Once all of the solids were dissolved, Polyacrylate A was added and the resulting mixture was mixed well. To this mixture was added either EBECRYL 1561 or EPON 828 or ERL 4221; TTE; CD1012 and Benzophenone (BZP) in the amounts shown in Table 13.

TABLE 13

| Ex. | Polyacrylate A (grams) | Ethyl Acetate (grams) | Irgacure 651 (grams) | Ebecryl 1561 (grams) | Epon 828 (grams) | ERL 4221 (grams) | TTE (grams) | CD1012 (grams) | BZP (grams) |
|---|---|---|---|---|---|---|---|---|---|
| 12 | 30.0 | 20.0 | 0.02 | 3.75 | 0 | 0 | 0 | 0.15 | 0 |
| 13 | 48.0 | 25.0 | 0 | 0 | 4.69 | 0 | 0.13 | 0.19 | 0.19 |
| 14 | 48.0 | 25.0 | 0 | 0 | 0 | 4.69 | 0.13 | 0.19 | 0.19 |

Laminate Preparation

After mixing, the solution for example 12 was coated onto the non-metallized side of an AR Film, dried at 70° C. for 10 minutes to yield a 37.5 μm thick dry PSA tape. Samples of this PSA tape were laminated onto a Glass Microscope Slide. After 24 hour dwell, these laminates were irradiated (through the AR Film) with a Fusion UV Curing System at the following conditions for a total UVA (320–390 nm) dose of about 1 J/cm$^2$: Fusion "D" bulb, 300 Watts/Inch, 50 feet/minute, 2 passes. After irradiation, these samples were stored at ambient temperature for at least 24 hours before any further testing was carried out.

The adhesive solutions for examples 12–14 were coated onto the T-30 Release Liner, dried at 70° C. for 10 minutes to yield a 37.5 μm thick dry PSA film. This PSA film was laminated onto the non-metallized surface of a PTC21 Film. The release liner was removed and the PSA construction was laminated onto a Polycarbonate Plate. These laminates were irradiated (through the PTC21 Film) with a Fusion UV Curing System at the following conditions for a total UVA (320–390 nm) dose of about 1.0 J/cm$^2$, UVB (280–320 nm) dose of about 0.7 μl cm$^2$: Fusion "D" bulb, 300 Watts/Inch, 50 feet/minute, 2 passes. After irradiation these samples were stored at ambient temperature for at least 24 hours before any aging test was carried out.

Optical Properties Testing

The AR Film/adhesive/Glass Microscope Slide laminate for Example 12 was tested for Luminous Transmittance, Haze and Opacity according to the test methods described above. The optical data are presented in Table 14.

TABLE 14

| Example | Epoxy component (% by weight) | TMPTA (% by weight) | Luminous Transmittance (%)* Averaged 380–720 nm | Haze (%) C2° | Haze (%) A2° | Opacity (%) C2° | Opacity (%) A2° |
|---|---|---|---|---|---|---|---|
| 12 | 32% | 0% | 95.1 | 0.9 | 0.9 | 0.4 | 0.4 |

*Glass used as reference, T % = 100% through glass slide

Aging Tests

Laminates of PCT21 Film/adhesive/Polycarbonate Plate were aged using the test protocols described above. These results and details of the test conditions are presented in Table 15.

TABLE 15

| Example PTC21 Film/adhesive/ Polycarbonate Laminates | Aging Test Conditions (85° C. for 7 days) | Aging Test Conditions (80° C./90% RH for 7 days) |
|---|---|---|
| 12 | Pass | Pass |
| 13 | Pass | Pass |
| 14 | Pass | Pass |

EXAMPLE 15

COMPARATIVE EXAMPLE C4

Adhesive Preparation

In a brown glass reaction vessel was placed RHODORSIL 2074 or CD1012, Irgacure 651, and Polyacrylate B in the amounts shown in Table 16. To this mixture was added ABP, TMPTA, EPON 828, ERL 4221 and TTE in the amounts shown in Table 16.

TABLE 16

| Ex. | Polyacrylate B (grams) | Irgacure 651 (grams) | ABP (grams) | TMPTA (grams) | Epon 828 (grams) | ERL 4221 (grams) | TTE (grams) | Rhodorsil 2070 (grams) | CD1012 (grams) |
|---|---|---|---|---|---|---|---|---|---|
| 15 | 50.0 | 0.13 | 0.5 | 0.25 | 3.13 | 3.13 | 0.13 | 0 | 0.38 |
| C4 | 50.0 | 0.13 | 0.5 | 0.25 | 6.25 | 0 | 0.13 | 0.38 | 0 |

Laminate Preparation

After mixing, this solution was coated onto the non-metallized side of an AR Film, dried at 70° C. for 10 minutes to yield a 37.5 μm thick dry PSA tape. Samples of this PSA tape were laminated onto a Polycarbonate Plate or Glass Microscope Slide. After 24 hour dwell, these laminates were irradiated (through the AR Film) with a Fusion UV Curing System at the following conditions for a total UVA (320–390 nm) dose of about 1 J/cm$^2$: Fusion "D" bulb, 300 Watts/Inch, 50 feet/minute, 2 passes. After irradiation, these samples were stored at ambient temperature for at least 24 hours before any aging test was carried out.

Optical Properties Testing

The AR Film/adhesive/Glass Microscope Slide laminates were tested for Luminous Transmittance, Haze and Opacity according to the test methods described above. The optical data are presented in Table 17.

TABLE 17

| Example | Epoxy component (% by weight) | TMPTA (% by weight) | Luminous Transmittance (%)* Averaged 380–720 nm | Haze (%) C2° | Haze (%) A2° | Opacity (%) C2° | Opacity (%) A2° |
|---|---|---|---|---|---|---|---|
| 15 | 32% | 1.3% | 95.0 | 0.8 | 0.8 | 0.4 | 0.4 |
| C4 | 32% | 1.3% | 95.1 | 0.8 | 0.8 | 0.4 | 0.4 |

*Glass used as reference, T % = 100% through glass slide

Aging Tests

The laminate of AR Film/adhesive/Polycarbonate Plate was aged using the test protocols described above. These results and details of the test conditions are presented in Table 18.

TABLE 18

| Example AR Film/adhesive/Polycarbonate Laminate | Aging Test Conditions (85° C. for 7 days) | Aging Test Conditions (80° C./90% RH for 7 days) |
|---|---|---|
| 15 | Pass | Pass |

EXAMPLES 16–21

COMPARATIVE EXAMPLE C5

The adhesive samples described in Examples 1–6 and Comparative Example C4 were used to prepare multi-layer laminates. The adhesive solution was coated onto the T-30 Release Liner, dried at 70° C. for 10 minutes to yield a 37.5 μm thick dry PSA film. This PSA film was laminated onto the KE surface of a pre-made construction containing HB3/Bostik Adhesive/KE Film. The release liner was removed and the PSA construction was laminated onto a Polycarbonate Retardation Film. These laminates were irradiated (through the Polycarbonate Retardation Film) with a Fusion UV Curing System at the following conditions for a total UVA (320–390 nm) dose of about 1.0 J/cm², UVB (280–320 nm) dose of about 0.7 J/cm²: Fusion "D" bulb, 300 Watts/Inch, 50 feet/minute, 2 passes. After irradiation, further lamination onto the Polycarbonate Retardation Film was carried out using Soken 1885 PSA to Glass Microscope Slide. These samples were stored at ambient temperature for at least 24 hours before any aging test was carried out. The laminates were then aged using the test methods outlined above, the results are shown in Table 19.

TABLE 19

| Example HB3/Bostik Adhesive/KE Film/adhesive/Polycarbonate Retardation Film/Soken PSA/Glass Laminates | Adhesive Formulation Used | Aging Test Conditions (90° C. for 7 days) | Aging Test Conditions (80° C./90% RH for 7 days) |
|---|---|---|---|
| 16 | 1 | Bubbles | Bubbles |
| 17 | 2 | Bubbles | Bubbles |
| 18 | 3 | Pass | Pass |
| 19 | 4 | Pass | Pass |
| 20 | 5 | Pass | Pass |
| 21 | 6 | Pass | Pass |
| C5 | C4 | Bubbles | White Haze; Bubbles |

EXAMPLES 22–24

The adhesive samples described in Examples 4, 5, and 7 were used to prepare protective coatings on KE Film. The adhesive solution was coated onto the T-30 Release Liner, dried at 70° C. for 10 minutes to yield a 50.8 μm thick dry PSA film. Two samples of this PSA film were laminated onto each surface of a KE Film to form a laminate of release liner/adhesive/KE Film/adhesive/release liner. The laminates were irradiated (through the release liners) with a Fusion UV Curing System "D" bulb, 50 feet/minute, 2 passes for each side, for a total UVA (320–390 nm) dose of about 1 J/cm² for each side. The release liner was removed from the cured adhesive after 24 hours. The laminate of cured adhesive/KE Film/cured adhesive was then aged for 500 hours using the test methods outlined above, the results are shown in Table 20.

TABLE 20

| Example | Adhesive Formulation Used | Aging Test Conditions (90° C. for 500 hours) | Aging Test Conditions (80° C./90% RH for 500 hours) |
|---|---|---|---|
| 22 | 4 | Pass | Pass |
| 23 | 5 | Pass | Pass |
| 24 | 7 | Pass | Pass |

EXAMPLE 25

The adhesive samples described in Example 5 was used to prepare laminates with IR Film. The adhesive solution was coated onto the IR Film, dried at 70° C. for 10 minutes to yield a 38.1 μm thick dry PSA tape. Samples of this PSA tape were laminated onto a Polycarbonate Plate or PMMA Plate. After 24 hour dwell, these laminates were irradiated (through the IR Film) with a Fusion UV Curing System at the following conditions for a total UVA (320–390 nm) dose of about 1 J/cm²: Fusion "D" bulb, 300 Watts/Inch, 50 feet/minute, 2 passes. After irradiation, these samples were stored at ambient temperature for at least 24 hours before any aging test was carried out. The laminates were then aged for 500 hours using the test methods outlined above, the results are shown in Tables 21–22.

TABLE 21

| Example IR Film/adhesive/Polycarbonate Laminate | Adhesive Formulation Used | Aging Test Conditions (90° C. for 500 hours) | Aging Test Conditions (80° C./90% RH for 500 hours) |
|---|---|---|---|
| 25 | 5 | Pass | Pass |

TABLE 22

| Example IR Film/adhesive/ PMMA Laminate | Adhesive Formulation Used | Aging Test Conditions (90° C. for 500 hours) | Aging Test Conditions (80° C./90% RH for 500 hours) |
| --- | --- | --- | --- |
| 25 | 5 | Pass | Pass |

What is claimed is:

1. A curable adhesive composition comprising polyacrylate component comprising an acrylic acid reactive functional group, epoxy component, and cationic initiator, wherein the uncured adhesive exhibits properties of a pressure sensitive adhesive and is optically clear such that the luminous transmission of the composition is greater than 90%, the haze of the composition is less than 2%, and the opacity of the composition is less than 1%, wherein the uncured, curable adhesive can be cured to form an adhesive comprising an inter-reacted interpenetrating polymer network, and wherein after aging the cured adhesive at 90° C. for 500 hours the luminous transmission of the cured and aged adhesive is greater than 90%, the haze of the cured and aged adhesive is less than 2%, and the opacity of the cured and aged adhesive is less than 1%.

2. The adhesive of claim 1 wherein after aging at 80° C. and 90% relative humidity for 500 hours the luminous transmission of the cured and aged adhesive is greater than 90%, the haze of the cured and aged adhesive is less than 2%, and the opacity of the cured and aged adhesive is less that 1%.

3. The adhesive of claim 1 wherein the cured adhesive consists of a single phase.

4. The adhesive of claim 1 wherein the polyacrylate component is a polymer derived from free-radically polymerizable monomers selected from the group of acrylates, methacrylates, acrylic acids, and methacrylic acids.

5. The adhesive of claim 1 wherein the polyacrylate component is a polymer derived from acrylic acid monomer.

6. The adhesive of claim 1 comprising an epoxy component selected from the group consisting of aromatic and cycloaliphatic epoxy components.

7. The adhesive of claim 1 wherein the cationic initiator comprises photoactivated cationic initiator.

8. The adhesive of claim 7 wherein the photoactivated cationic initiator is selected from the group consisting of an iodonium salt, a sulfonium salt, and mixtures thereof.

9. The adhesive of claim 1 comprising a photosensitizer.

10. The adhesive of claim 1 comprising a free-radical photoinitiator selected from the group consisting of benzoin ethers, substituted benzoin ethers, substituted acetophenones, substituted alpha-ketols, aromatic sulfonyl chlorides, photoactive oximes, and mixtures thereof.

11. The composition of claim 1 comprising a grafting agent.

12. The composition of claim 11 wherein the grafting agent is 4-acryloxy benzophenone.

13. The composition of claim 11 comprising an epoxyacrylate compound.

14. The composition of claim 11 comprising crosslinker.

15. The composition of claim 14 wherein the crosslinker comprises a multifunctional acrylate or (meth)acrylate.

16. The composition of claim 14 wherein the crosslinker is selected from the group consisting of hexanediol diacrylate, trimethylolpropane triacrylate, and mixtures thereof.

17. The composition of claim 1 comprising from about 5 to about 55 parts by weight epoxy per 100 parts by weight epoxy and polyacrylate.

18. The composition of claim 1 comprising from about 10 to about 50 parts by weight epoxy per 100 parts by weight epoxy and polyacrylate.

19. An optical element comprising a first material layer bonded to a second material layer by a layer of the adhesive of claim 1, wherein at least one of the first and second materials layers is an outgassing layer comprising polycarbonate or acrylic.

* * * * *

UNITED STATES PATENT AND TRADEMARK OFFICE
CERTIFICATE OF CORRECTION

PATENT NO. : 6,949,297 B2 Page 1 of 1
APPLICATION NO. : 10/005669
DATED : September 27, 2005
INVENTOR(S) : Yang, Jie It is certified that error appears in the above-identified patent and that said Letters Patent is hereby corrected as shown below:

Column 13,
Line 19, delete "isobomyl" and insert -- isobrnyl --.

Column 23,
Line 32, delete "0.7 µl cm$^2$" and insert -- 0.7 J/ cm$^2$ --.

Column 27,
Line 40, after "less" delete "that" and insert -- than --.

Signed and Sealed this

Fourth Day of July, 2006

JON W. DUDAS
*Director of the United States Patent and Trademark Office*